United States Patent [19]

Kitaura et al.

[11] Patent Number: 5,425,111
[45] Date of Patent: Jun. 13, 1995

[54] IMAGE PROCESSING APPARATUS

[75] Inventors: Aoi Kitaura, Yoshino; Masaki Takakura, Higashi-Osaka; Yasukuni Yamane, Shiki; Noritoshi Kako, Nara, all of Japan

[73] Assignee: Sharp Kabushiki Kaisha, Osaka, Japan

[21] Appl. No.: 231,908

[22] Filed: Apr. 25, 1994

Related U.S. Application Data

[63] Continuation of Ser. No. 885,726, May 19, 1992, abandoned.

[30] Foreign Application Priority Data

Jun. 3, 1991 [JP] Japan .................. 3-131149

[51] Int. Cl.⁶ .............................. G06K 9/36
[52] U.S. Cl. ...................... 382/276; 382/191; 345/188; 345/199
[58] Field of Search ............. 382/17, 41; 358/518, 358/515; 345/150, 90, 199, 186, 187, 188; 348/179

[56] References Cited

U.S. PATENT DOCUMENTS

| | | | |
|---|---|---|---|
| 4,727,425 | 2/1988 | Mayne et al. | 358/75 |
| 4,734,760 | 3/1988 | Futaki | 358/75 |
| 4,739,313 | 4/1988 | Oudshoorn | 340/703 |
| 4,853,681 | 8/1989 | Takashima | 340/703 |
| 4,868,552 | 9/1989 | Chang | 340/703 |
| 4,907,078 | 3/1990 | Hasebe | 358/75 |
| 4,908,610 | 3/1990 | Yamamuro | 340/703 |
| 5,095,301 | 3/1992 | Guttag | 340/703 |
| 5,124,688 | 6/1992 | Rumball | 358/23 |
| 5,153,576 | 10/1992 | Harrington | 358/75 |
| 5,168,352 | 12/1992 | Naka | 382/15 |

FOREIGN PATENT DOCUMENTS 60-202318 10/1985 Japan .
62-151986 7/1987 Japan .

Primary Examiner—Yon J. Couso
Attorney, Agent, or Firm—David G. Conlin; George W. Neuner; Kevin J. Fournier

[57] ABSTRACT

A image processing apparatus for coloring an original image includes a unit for inputting an original image to be painted and a color image, a unit for dividing the original image input by the inputting unit into a plurality of areas corresponding to the original image and for generating area information data corresponding to the plurality of areas, a unit for selecting the same number of colors as the number of the plurality of areas based on data of the color image input by the inputting unit, and a unit for allocating the colors selected by the selecting unit to the plurality of divided areas based on the area information data.

21 Claims, 16 Drawing Sheets

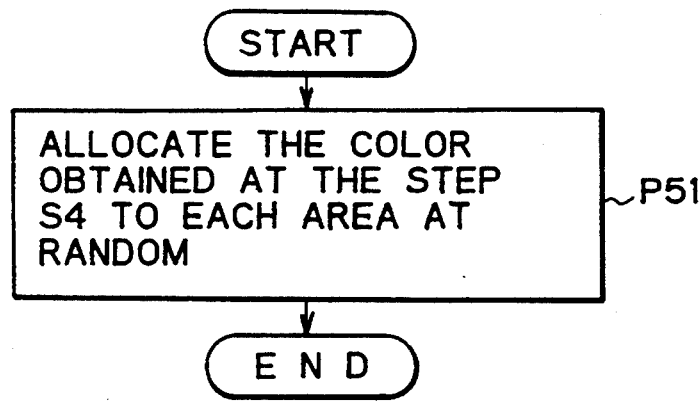
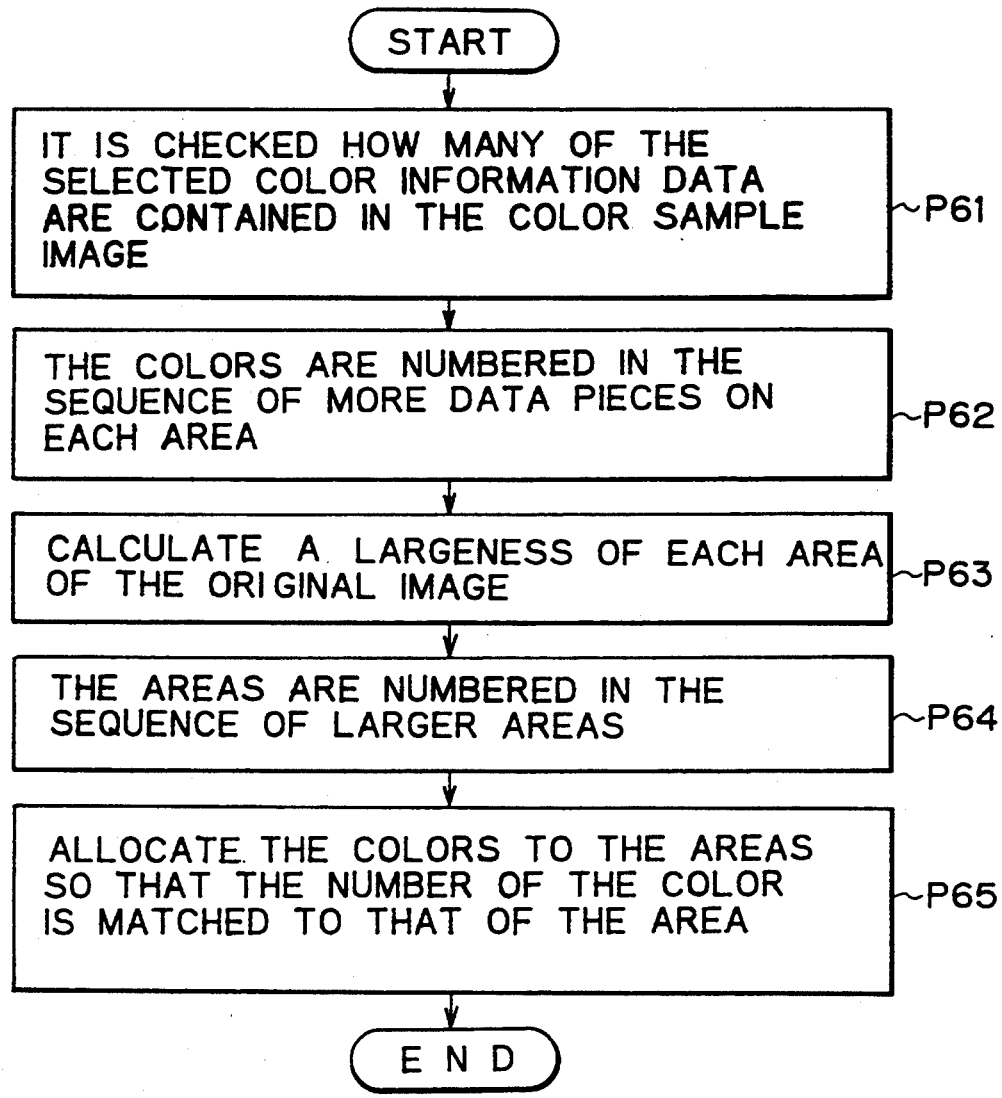

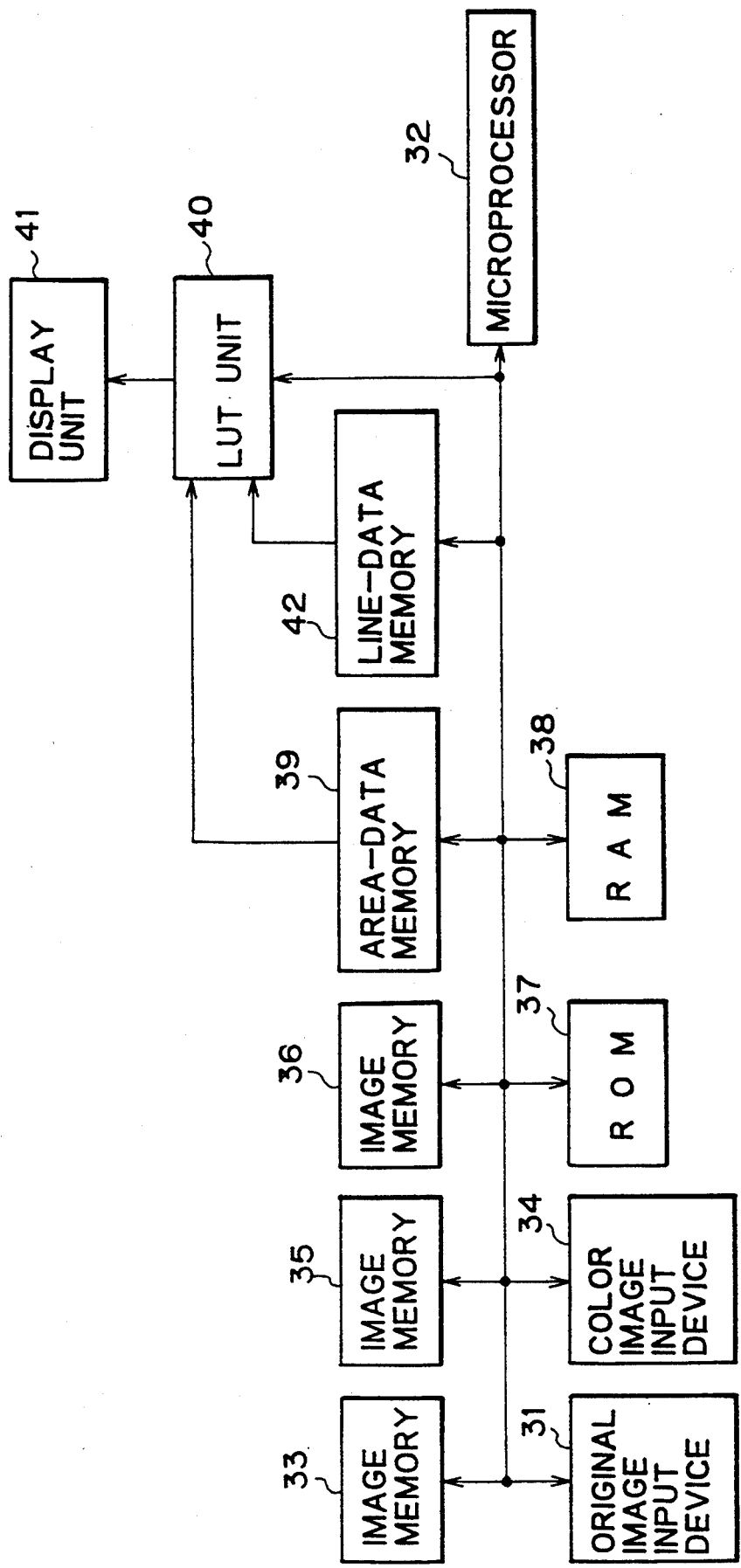

IMAGE PROCESSING APPARATUS

This is a continuation of application Ser. No. 07/885,726 filed on May 19, 1992 now abandoned.

BACKGROUND OF THE INVENTION

1. Field of the Invention

The present invention relates to an image processing apparatus which has a capability of coloring a monochrome image.

2. Description of the Related Art

For creating a color image such as a color illustration or a color animation, as a traditional method, an operator paints a monochrome original image by his hands. In recent days, the present inventors know that an image processing apparatus has been developed for coloring a monochrome original image. This type of image processing apparatus is capable of painting a monochrome image for quite a short time and easily re-painting the image.

However, such the image processing apparatus just assists in the color-painting work. It lacks in an important function when painting colors on the original image, that is, a function of selecting a color to be painted.

Hence, the image processing apparatus needs an operator's decision as to a color to be painted. It means that the operator has to input his or her selected colors into the apparatus. As a color input method, it is possible to employ the methods of displaying a color palette on a display and specifying an object color on the color palette, of entering a numerical value corresponding to each color component from a keyboard, and of displaying on the display a numerical value corresponding to a color component with a bar graph and entering the color data by changing a length of the bar graph.

Any one of these methods allows just one color to be input at just one time. In order to input several colors, therefore, the apparatus needs a considerably long time and troublesome operation. For example, since the combination of colors is quite important when painting colors on an original image, many trials are inevitably made for selecting the most appropriate color combination. The trial needs at one time several colors to be input to the apparatus. Hence, the selection of color combination needs a considerably long time and a troublesome operation.

SUMMARY OF THE INVENTION

It is therefore an object of the present invention to provide an image processing apparatus which is capable of easily inputting data of colors to be painted into the apparatus itself for a quite short time.

In carrying out the object, according to a first aspect of the invention, a image processing apparatus for coloring an original image includes:

a unit for inputting an original image to be painted and a color image;

a unit for dividing the original image input by the inputting unit into a plurality of areas corresponding to the original image and for generating area information data corresponding to the plurality of areas;

a unit for selecting the same number of colors as the number of the plurality of areas based on data of the color image input by the inputting unit; and a unit for allocating the colors selected by the selecting unit to the plurality of divided areas based on the area information data.

According to a second aspect of the invention, an image processing apparatus for coloring an original image includes:

a unit for inputting an original image to be painted and a color image;

a unit for dividing the original image input by the inputting unit into a plurality of areas corresponding to the original image and for generating area information data corresponding to the plurality of areas;

a unit for selecting the same number of colors as the number of the plurality of areas based on data of the color image input by the inputting unit;

a unit for allocating the colors selected by the selecting unit to the plurality of divided areas based on the area information data; and a unit for processing border lines among the plurality of divided areas, the processing unit serving to change a color of an adjacent portion of the divided area to the border lines based on the data of the original image input by the inputting unit and the area information data.

In the operation of the first invention, an original image to be colored is input into the image processing apparatus itself through the inputting unit. Then, the unit for dividing the original image serves to divide the original image into a plurality of areas corresponding to the original image and generate area information data corresponding to the plurality of areas. On the other hand, a color image is input through the inputting unit. Then, the selecting unit serves to select the same number of colors as the number of the plurality of divided areas on the basis of the data about the input color image. The allocating unit serves to allocate the selected colors to the divided areas based on the area information data. Hence, the data about the colors to be used for painting the original image are allowed to be easily input to the image processing apparatus itself for a quite short time.

As mentioned above, unlike the foregoing known apparatus, the image processing apparatus according to the first aspect of the invention allows a group of colors to be input at one time without having to input one color at one time. Hence, the apparatus is capable of easily inputting the data about colors to be painted for a quite short time.

In the operation of the second invention, an original image to be colored is input into the image processing apparatus itself through the inputting unit. Then, the unit for dividing the original image serves to divide the original image into a plurality of areas corresponding to the original image and generate area information data corresponding to the plurality of areas. On the other hand, a color image is input through the inputting unit. Then, the selecting unit serves to select the same number of colors as the number of the plurality of divided areas on the basis of the data about the input color image. The allocating unit serves to allocate the selected colors to the divided areas based on the area information data. The border lines processing unit serves to change a color of an adjacent portion of the divided area to the border lines on the basis of the data about the input original image and the area information data.

Hence, the image processing apparatus according to the second aspect of the invention is capable of easily inputting the data about colors to be painted on the original image for a short time and gradually changing the color from the borders to the inside of each divided area without having to abruptly change the color of the border area. This results in making it possible to represent the borders with not a jagged curve but a smooth curve. The color is also gradually changed from the borders to the inside of each divided area. This results in making it possible to obtain a naturally-colored image.

Further objects and advantages of the present invention will be apparent from the following description of the preferred embodiments of the invention as illustrated in the accompanying drawings.

BRIEF DESCRIPTION OF THE DRAWINGS

FIG. 10 is a flowchart for explaining an embodiment of a first method of allocating a color to each divided area of an original image in the image processing apparatus shown in FIG. 1;

FIG. 11 is a flowchart for explaining one embodiment of a second method of allocating a color to each divided area of an original image in the image processing apparatus shown in FIG. 1;

FIG. 14 is a block diagram showing an arrangement of an image processing apparatus according to an embodiment of a second invention;

DESCRIPTION OF THE PREFERRED EMBODIMENTS

Figure 1:
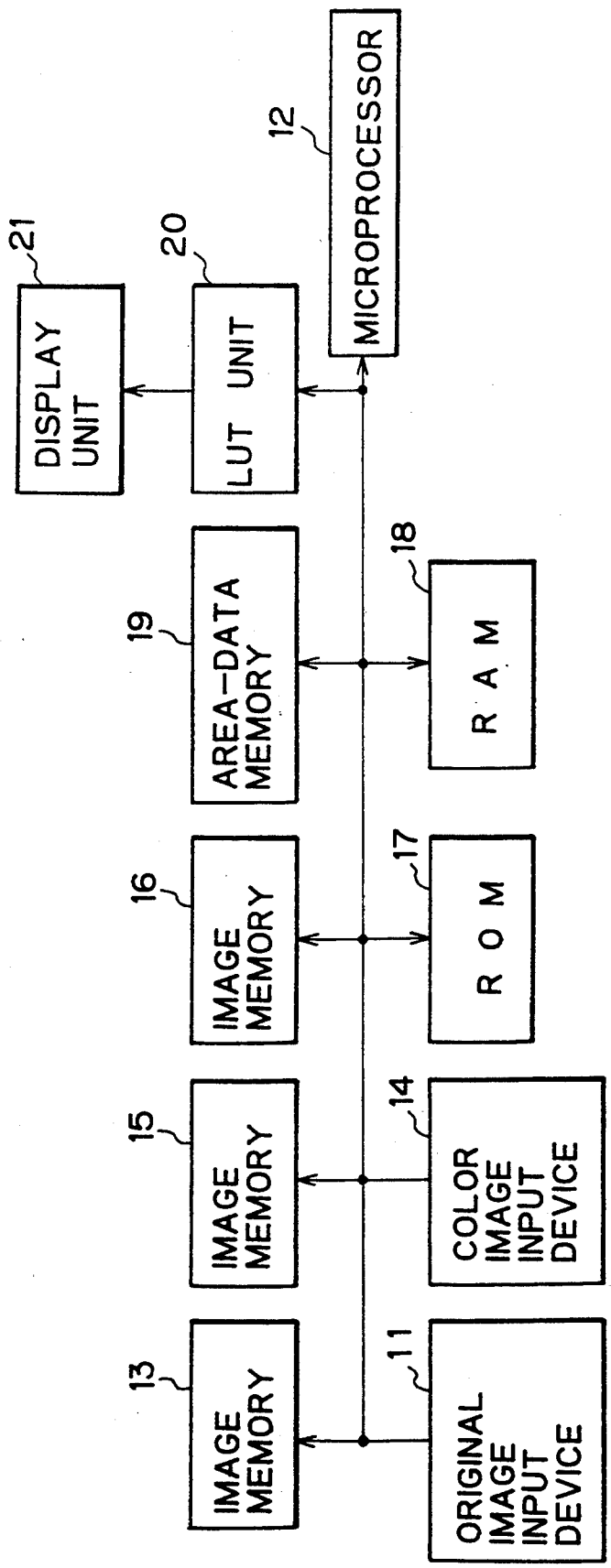
FIG. 1 is a block diagram showing an arrangement of an image processing apparatus according to an embodiment of a first invention.

Herein, the description will be directed to an embodiment of the present invention as referring to the drawings.

FIG. 1 is a block diagram showing an arrangement of an image processing apparatus according to an embodiment of the first invention.

As shown in FIG. 1, the image processing apparatus of this embodiment includes an original image input device 11, a microprocessor 12, an image memory 13, a color image input device 14, image memories 15 and 16, a read-only memory (ROM) 17, a random-access memory (RAM) 18, an area-data memory 19, a look-up table (LUT) unit 20 and a display unit 21.

As the original image input device 11, a video camera or a scanner may be used. A monochrome original image to be colored is input through the original image input device 11.

The image memory 13 operates to store the data about the original image input through the original image input device 11.

As the color image input device 14, a video camera or a scanner may be used. A color sample image is input through the color image input device 14.

The image memory 15 is arranged to store the data about the color sample image input through the color image input device 14. The image memory 16 is arranged to store the data about the color image formed by coloring the monochrome original image.

The ROM 17 stores a program for doing the coloring process required for operating the microprocessor 12. The RAM 18 stores the variables or the like required for operating the microprocessor 12.

The microprocessor 12 is operated on the program stored in the ROM 17 and by referring the variables stored in the RAM 18. The microprocessor 12 performs the coloring processing.

The area-data memory 19 is arranged to store the data about the divided areas of the original image stored in the image memory 13. The data about the divided areas of the original image are obtained by a procession of dividing the original image described later.

The LUT unit 20 includes a look-up table and a memory. The color image data stored in the image memory 16 is changed by the look-up table into the image-display data which are displayed on the display unit 21.

The display unit 21 is arranged to display an image based on the image-display data read from the LUT unit 20.

According to this embodiment, the image memories 13, 15 and 16 and the area-data memory 19 are provided as individual units. For those memories, one memory with a large storage capacitance may be arranged to be shared for those purposes. In addition, one image input device may commonly used for the original image input device 11 and the color image input device 14.

Next, the description will be directed to an operation of the image processing apparatus of this embodiment.

Figure 2:
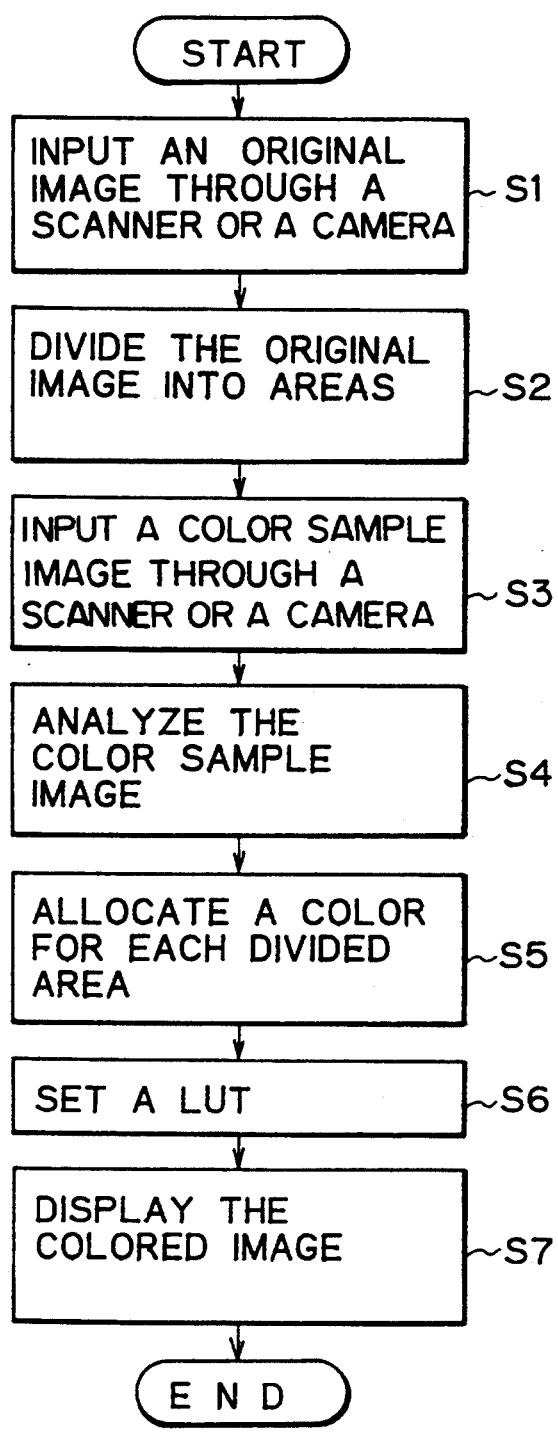
FIG. 2 is a flowchart for explaining an operation of the image processing apparatus shown in FIG. 1.
Figure 3:
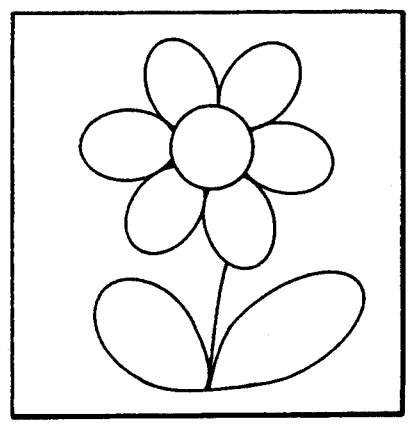
FIG. 3 is an illustration showing an example of a monochrome original image to be input to the image processing apparatus shown in FIG. 1.
Figure 4:
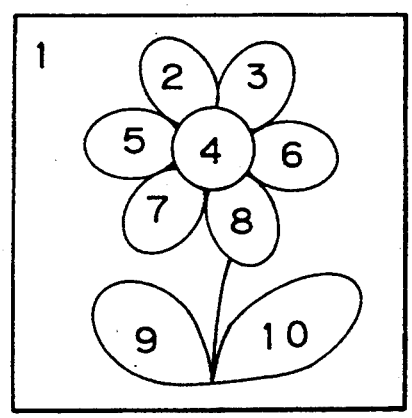
FIG. 4 is an illustration showing the original image divided into a plurality of areas to which reference numbers are given.

FIG. 2 is a flowchart showing the operation of the image processing apparatus shown in FIG. 1. FIG. 3 shows one example of a monochrome original image to be input to the image processing apparatus shown in FIG. 1. FIG. 4 shows the original image divided into a plurality of areas to which the reference numbers are given.

As shown in FIG. 2, at first, the monochrome original image to be colored is input through a scanner, one example of the original image input device 11 (step S1). The input monochrome original image is shown in FIG. 3. The input original image is stored in the image memory 13 under the control of the microprocessor 12.

Then, the microprocessor 12 divides the original image into a plurality of areas as shown in FIG. 4 as reading out the data about the original image from the image memory 13. The reference number is labeled to each divided area. The data about each divided area is stored in the area-data memory 19 (step S2).

The image-dividing process at the step S2 may be executed by various methods.

Figure 5:
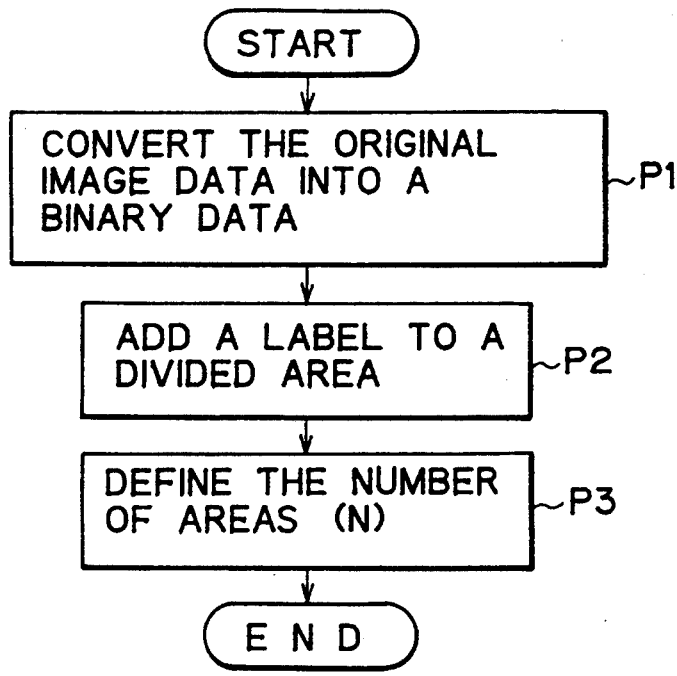
FIG. 5 is a flowchart for explaining an embodiment of an operation of dividing an original image into a plurality of areas in the image processing apparatus shown in FIG. 1.

FIG. 5 is a flowchart for explaining one example of the image-dividing process done for the original image. This process is executed in the image processing apparatus shown in FIG. 1.

As shown in FIG. 5, the input original image is converted into a binary data (step P1). A label is given to each of areas so that regions to which the same value is labeled are regarded as one region (step P2). Then, the number of areas N (positive integer) is defined (step P3).

The question as to how the label is given to each divided area, that is, which number is to be given to what area is determined by a labeling algorithm being used. However, the algorithm is not an essential problem on carrying out the object of the first invention.

Turning to FIG. 2 again, the color sample image is input through the scanner, that is, one example of the color image input device 14 (step S3). The input color sample image is stored in the image memory 15 under the control of the microprocessor 12.

Next, the microprocessor 12 analyzes the color sample image data stored in the image memory 15 and selects the same number of colors as the number of areas N divided at the step S2 (step S4). Those selected colors are used for painting each divided area.

The method for selecting these colors may employ the following methods.

Figure 6:
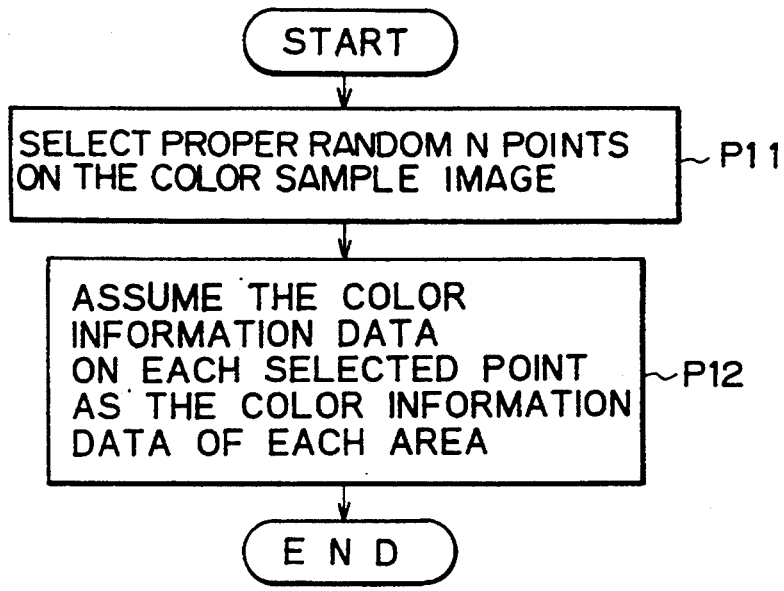
FIG. 6 is a flowchart for explaining an embodiment of a first method of selecting a color used for painting each divided area of an original image in the image processing apparatus shown in FIG. 1.

FIG. 6 is a flowchart for explaining an embodiment of a first method of selecting the colors used for painting each divided area of the original image.

In the first selecting method as shown in FIG. 6, proper N points on the color sample image are selected by using random numbers (step P11). The color information data on each of the selected N points is assumed as the color information data for each divided area (step P12). In place of using the random numbers, the N points may be selected as points on which the color sample image is uniformly divided and the color information data on each of the N points may be used. In case of using the random numbers, the random numbers may be those generated on the overall image at a uniform probability or those generated so that the probability is made higher as closer to the central portion of the image.

Figure 7:
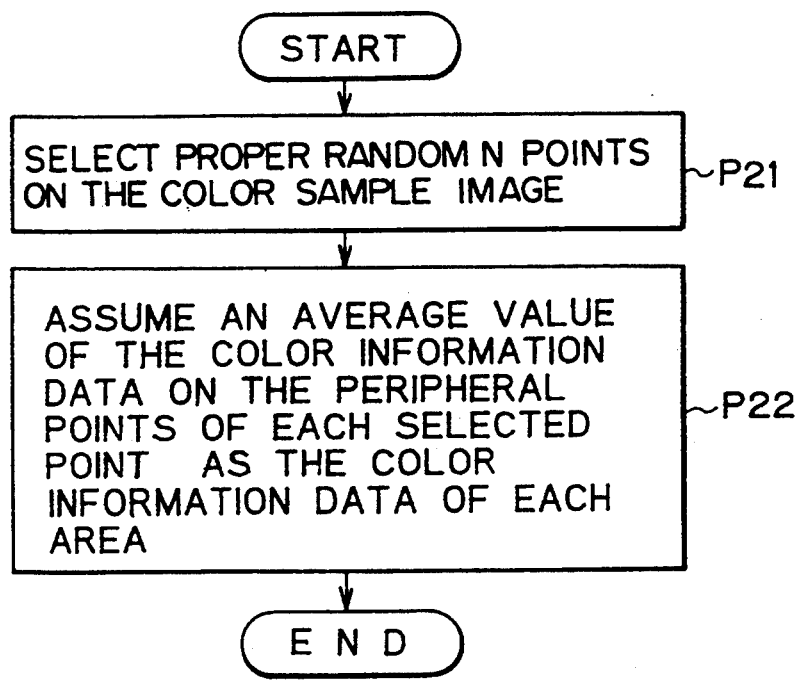
FIG. 7 is a flowchart for explaining an embodiment of a second method of selecting colors used for painting the divided areas of an original image in the image processing apparatus shown in FIG. 1.

FIG. 7 is a flowchart for explaining an embodiment of the second method of selecting the colors used for painting each divided area of the original image.

In the second selecting method as shown in FIG. 7, proper N points are selected on the color sample image like the foregoing first selecting method (step P21), that is, selected by using the random numbers. Then, unlike the first method, an average value of the color information data about several points around each of the N points is assumed as the color information data of the divided area (step P22). Or, the most frequently appearing color information data of the color information data about several points around each of the N points is assumed as the color information data of the divided area. This method makes it possible to select the color on which the color sample image is reflected more.

In a third method of selecting colors, the appearing frequency of the color information data is derived from the color sample image and the N colors are selected in the higher frequency order.

The foregoing first and second methods are arranged to define the coordinates of the N points on the color sample image and select the color based on the color of each defined coordinate. This third method is arranged to define the color irrespective of the coordinate. Then, the description will be directed to the third selecting method.

Figure 8:
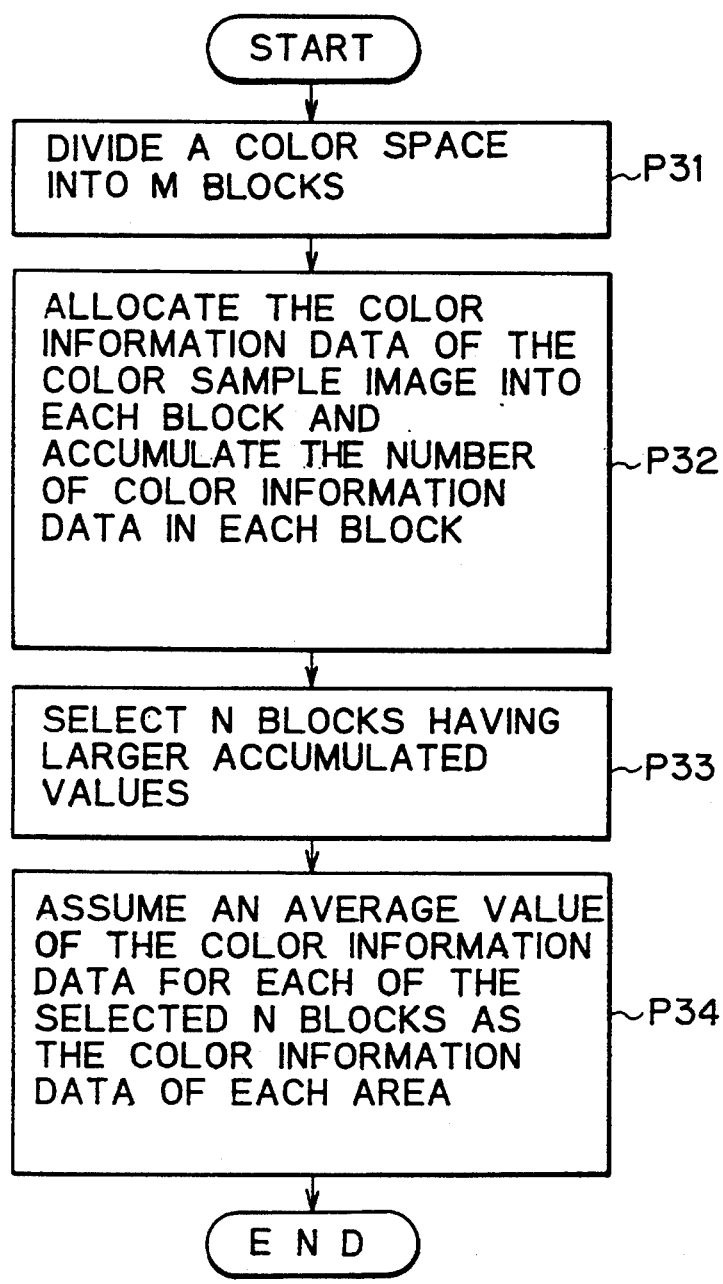
FIG. 8 is a flowchart for explaining one embodiment of a third method of selecting colors used for painting the divided areas of an original image in the image processing apparatus shown in FIG. 1.

FIG. 8 is a flowchart for explaining one embodiment of the third method of selecting colors used for painting the divided areas of the original image executed in the image processing apparatus shown in FIG. 1.

As shown in FIG. 8, in the first embodiment of the third method, a color space (for example, an RGB space formed on the assumption that the color information data is (R, G and B)) is divided into M (M is a positive integer) blocks (step P31). It is checked how blocks contained in the M blocks of this color space share the color information data about all the points of the color sample image and the number of the color information data contained in each block is accumulated (step P32). Herein, R stands for red, G stands for green and B stands for blue. Further, the total number of blocks M is set to be larger than the number of the divided areas N.

Next, the N blocks having larger accumulated values are selected from the M blocks (step P33). Then, an average value of the color information data contained in each of the N blocks is derived and each average value is assumed as the color information data of each area (step P34).

Herein, the RGB space is used for the color space. As another method, this method may employ the color information data represented by the other color coordinate. The division of the color space is not limited to the division into M blocks.

According to this embodiment of the third selecting method, the color which has the greatest number of the color information data contained in the color sample image is selected. If many similar kind of colors are contained in the color sample image, the appearance frequency of the color information data is concentrated on the adjacent blocks in the color-space blocks so that the selected colors may become the similar ones. To overcome this shortcoming, the blocks are divided into some groups and then one color is allocated to one group.

Figure 9:
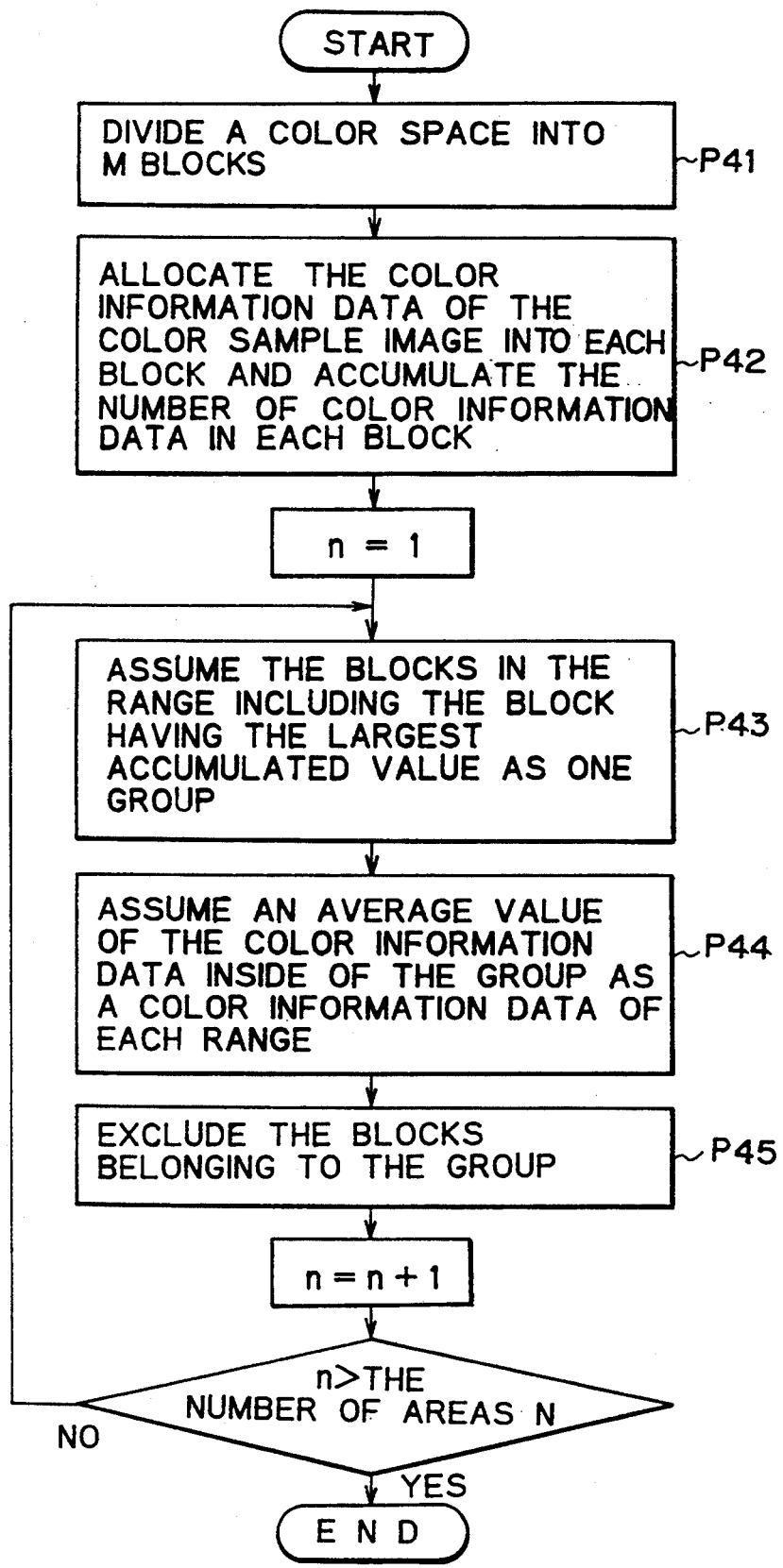
FIG. 9 is a flowchart for explaining another embodiment of a third method of selecting colors used for painting the divided areas of an original image in the image processing apparatus shown in FIG. 1.

FIG. 9 is a flowchart for explaining another embodiment of the third method of selecting colors used for painting the divided areas of the original image in the image processing apparatus shown in FIG. 1.

As shown in FIG. 9, like the first embodiment of the third selecting method, the color space is divided into M blocks (step P41). It is checked how the color information data about all the points of the color sample image are distributed on the M blocks in this color space. Then, the color information data contained in each block are accumulated (step P42).

Next, the block having the largest accumulated, value is located. Then, the blocks in a range R having the located block are assumed to belong to the same group (the first group). That is, the block having the largest accumulated value and the other blocks in the range R adjacent to the block having the largest accumulated value are assumed to belong to the same group (step P43). The range R may be defined to be within a predetermined distance from the block having the largest accumulated value in the color space.

Next, the process is executed to derive an average value of the color information data contained in the first group. The average value is assumed as the color information data for one range (step P44).

Then, the blocks contained in the first group are excluded (step P45) and the process returns to the step P43 for locating the block having the largest accumulated value.

At the step P43, the block having the largest accumulated value is located. Then, the located block and the other blocks in the range R adjacent to the located block are assumed to belong to the second group. In turn, the process is executed to take an average value of the color information data contained in the second group and assume the average value as the color information data in another area (step P44). The blocks belonging to the second group are excluded from the process (step P45) and the process returns to the step P43.

The process from the steps P43 to P45 is repetitively executed until the selection of the color information data in all the areas is terminated, that is, a counter n (positive integer) becomes equal to the number of areas N. If the range R may be defined to be a bit wider, it is difficult to obtain all the N color information data. Hence, the range R has to be defined to have a proper distance considered in light of this respect.

After selecting the N color information data, based on the content of the area-data memory 19, the microprocessor 12 operates to allocate the colors for the selected color information data to the divided areas of the monochrome original image and stores the colored image data in the image memory 16 (step S5 shown in FIG. 2). This allocation corresponds to the coloring on the original image.

The allocation of the color to each area is carried out by a first or a second method. The first method is executed to allocate the colors at random. The second method reflects the quality of a color image.

FIG. 10 is a flowchart for explaining an embodiment of the first method of allocating a color to each divided area of the original image in the image processing apparatus shown in FIG. 1.

As shown in FIG. 10, the first method is executed to allocate the color for the color information data selected at the step S4 (see FIG. 2) to each area at random (step P51). This method just needs so simple processing that the colored image can be immediately displayed on the display unit 21. Hence, the coloring operation may be retried again and again during a short period of time until a desired color arrangement is obtained.

On the other hand, the second method uses the data about the color image such as a largeness of an area and a positional relation of objects on the image for the purpose of reflecting the quality of the color image when allocating the colors to the areas.

FIG. 11 is a flowchart for explaining an embodiment of the second method of allocating a color to each divided area of the original image in the image processing apparatus shown in FIG. 1.

As shown in FIG. 11, in the case of using the area data, at first, it is checked how many color information data selected at the step S4 (see FIG. 2) are contained in the color sample image (step P61). The colors are numbered in the sequence of more data, that is, in the larger areas sequence (step P62). Next, the largeness of each divided area of the monochrome original image is checked (step P63). The areas are numbered in the sequence of larger areas (step P64). Next, the color is allocated to each area so that both of the reference numbers may become equal to each other (step P65).

According to this embodiment of the second method, the color occupying a wider area of the color sample image is allocated to the larger area of the original image. This results in reflecting the color arrangement of the color sample image on the colors of the original image more exactly.

Figure 12:
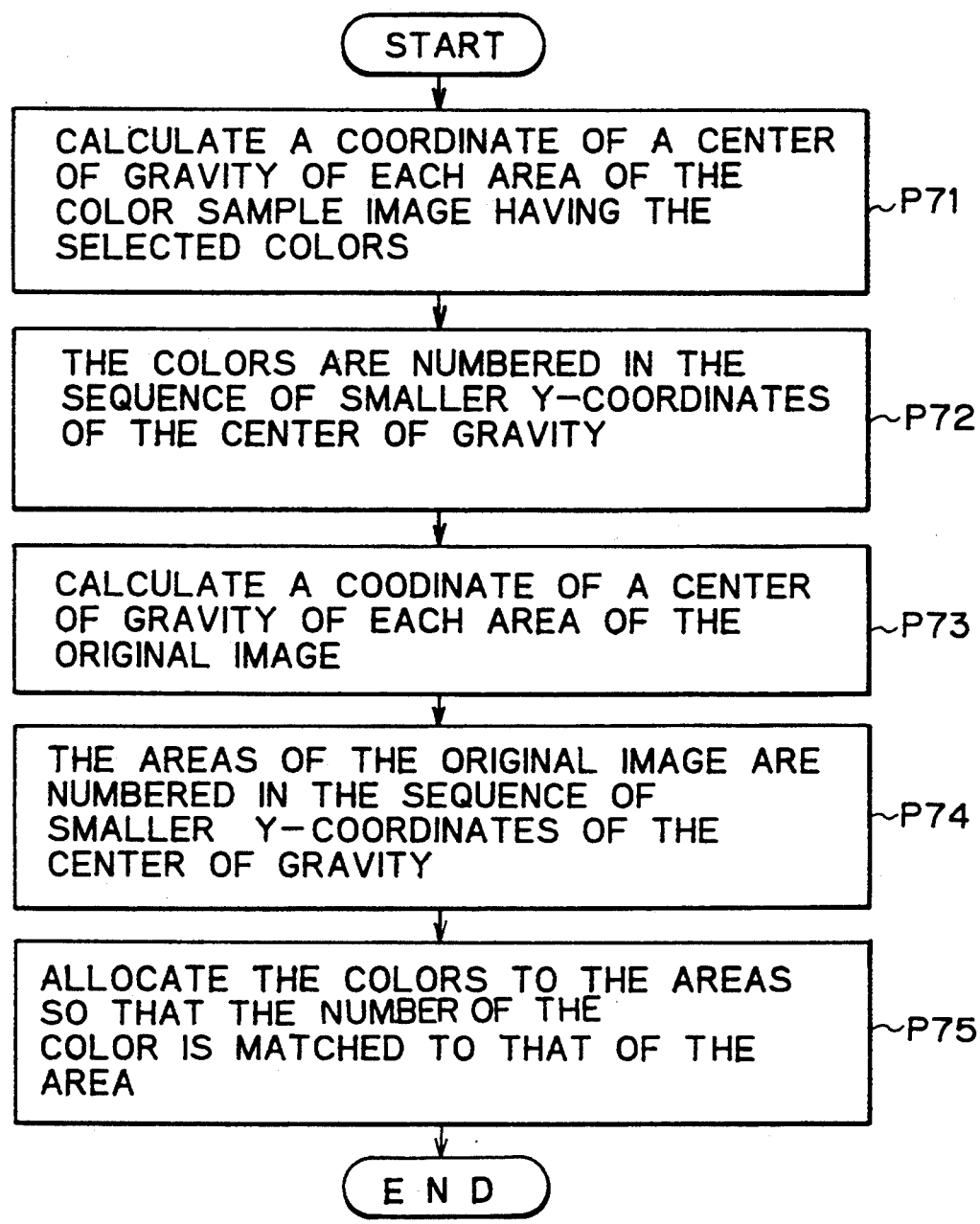
FIG. 12 is a flowchart for explaining another embodiment of a second method of allocating a color to each divided area of the original image in the image processing apparatus shown in FIG. 1.

FIG. 12 is a flowchart for explaining another embodiment of the second method of allocating a color to each divided area of the original image in the image processing apparatus shown in FIG. 1.

In the case of using the data about a positional relation, as shown in FIG. 12, at first, the process is executed to calculate a coordinate of a center of gravity of each area having a color for the color information data on the color sample image (step P71). The color information data is selected at the step S4 (see FIG. 2). The colors are numbered in the sequence where the calculated y-coordinates of the centers of gravity of the areas are made smaller (step P72). Likewise, the process is executed to calculate a coordinate of the center of gravity of each divided area of the original image (step P73). The divided areas are numbered in the sequence where the y-coordinates of the centers of gravity of the areas are made smaller (step P74). Then, the colors of the color sample image are allocated to the divided areas of the original image so that the reference numbers of the color sample image may become equal to those of the original image (step P75).

This embodiment makes it possible to paint the upper colors of the color sample image on the upper portion of the original image and the lower colors of the color sample image on the lower portion of the original image.

In place of calculating a coordinate of the center of gravity, it is possible to derive a distance between each divided area and the center of the color sample image or the original image and allocate the colors of the color sample image to the divided areas of the original image so that the derived distances of the color sample image may be matched to those of the original image. In this case, the color on the central portion of the color sample image is allocated onto the central portion of the original image and the color on the peripheral portion of the color sample image is allocated onto the peripheral portion of the original image.

As mentioned above, the foregoing first and second methods both take the steps of calculating a certain amount (a largeness and a coordinate of a center of gravity of each divided area, for example) with respect to both of the color sample image and the original image and allocating a color to each divided area of the original image so that the calculated amount sequence of the color sample image may become equal to that of the original image for the purpose of reflecting the quality of the color sample image on the original image more exactly.

Another method rather than the foregoing methods may be used for allocating a color to each divided area of the original image. That is, the factors such as a peripheral length of each area or a number of holes may be used for the allocation of colors to the divided areas.

The microprocessor 12 operates to paint the proper colors on the original image after allocating the colors to the divided areas of the original image and store the image data containing hue, saturation and lightness of the resulting color image in the image memory 16. In addition, when painting the colors on the original image, the border between the adjacent areas is represented by a black line.

The microprocessor 12, then, operates to read the image data from the image memory 16 and write the data in the memory included in the LUT unit 20. The LUT unit 20 serves to set a look-up table on which the image data is converted into the image-display data (step S6 shown in FIG. 2). Then, on the converted data, the colored image is displayed on the display unit 21 (step S7 shown in FIG. 2).

As set forth above, the image processing apparatus according to the embodiment of the first invention is capable of inputting a group of colors at one time without having to input one color at one time. Hence, it is possible to input the data about each color easily and during quite a short time.

Further, the color input is carried out by inputting a color sample image without directly inputting the color data. Hence, an operator having insufficient knowledge about the color arrangement can effectively paint colors on the original image. Concretely, in the case that the operator tries to define a color arrangement, at a first stage, it is likelihood that he or she does not directly define concrete colors but picks up an abstract color image representing an atmosphere of autumn or a bright color image, for example. In this case, the known apparatus needs the operator to take the steps of determining the color arrangement for the abstract color image and inputting the colors into the apparatus itself. However, an ordinary person except a person having sufficient knowledge about color arrangement like a designer is difficult to take those steps. On the other hand, the image processing apparatus according to the embodiment of the first invention is capable of automatically determining a color arrangement representing an atmosphere of autumn, for example, simply by inputting a picture or a photograph standing for an autumn landscape as a color sample image.

Figure 13:
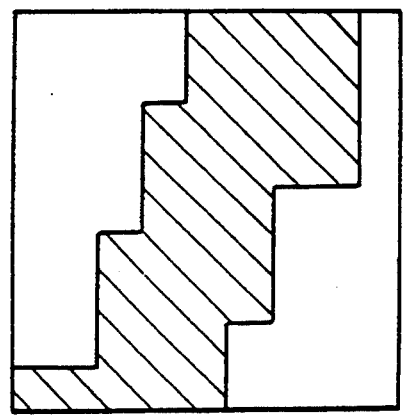
FIG. 13 is an expanded view showing the portion containing the borders of each divided area of the colored image obtained by the image processing apparatus shown in FIG. 1.

FIG. 13 is an expanded view showing the portion containing the borders of each divided area of the colored image obtained by the image processing apparatus shown in FIG. 1. In this figure, the borders are represented by oblique lines.

As shown in FIG. 13, near the border of each of areas represented by oblique lines, the pixels for the borders are adjacent to those in the area which have characteristics different from that of the pixels for the borders. Hence, the borders are clearly separated from the colored area and are represented as jagged lines. Further, the borders seem to be thinner than the actual line on the colored image. To overcome this shortcoming, it is necessary to shade off the peripheries of the borders.

In turn, the description will be directed to an image processing apparatus according to an embodiment of a second invention.

FIG. 14 is a block diagram showing an arrangement of the image processing apparatus according to an embodiment of the second invention.

As shown in FIG. 14, the image processing apparatus of this embodiment includes an original image input device 31, a microprocessor 32, an image memory 33, a color image input device 34, image memories 35 and 36, a ROM 37, a RAM 38, an area-data memory 39, an LUT (look-up table) unit 40, a display unit 41 and a line-data memory 42.

The arrangement and the operation of the original image input device 31, the microprocessor 32, the image memory 33, the color image input device 34, the image memories 35 and 36, the ROM 37, the RAM 38, the area-data memory 39, the LUT unit 40 and the display unit 41 are the same as the original image input device 11, the microprocessor 12, the image memory 13, the color image input device 14, the image memories 15 and 16, the ROM 17, the RAM 18, the area-data memory 19, the LUT unit 20 and the display unit 21 included in the image processing apparatus according to the first invention shown in FIG. 1.

The difference between this embodiment and the apparatus shown in FIG. 1 is that the apparatus of this embodiment includes the line-data memory 42. When converting the color image data stored in the image memory 36 into the image-display data to be stored in the LUT unit 40, the data stored in the line-data memory 42 and the area-data memory 39 are used for shading off the peripheries of the borders.

In this embodiment, the image memories 33, 35 and 36 and the area-data memory 39 are individually provided. In place, one memory with a large storage capacity may be commonly used as those memories. For the original image input device 31 and the color image input device 34, one image input device may be commonly used.

Figure 15:
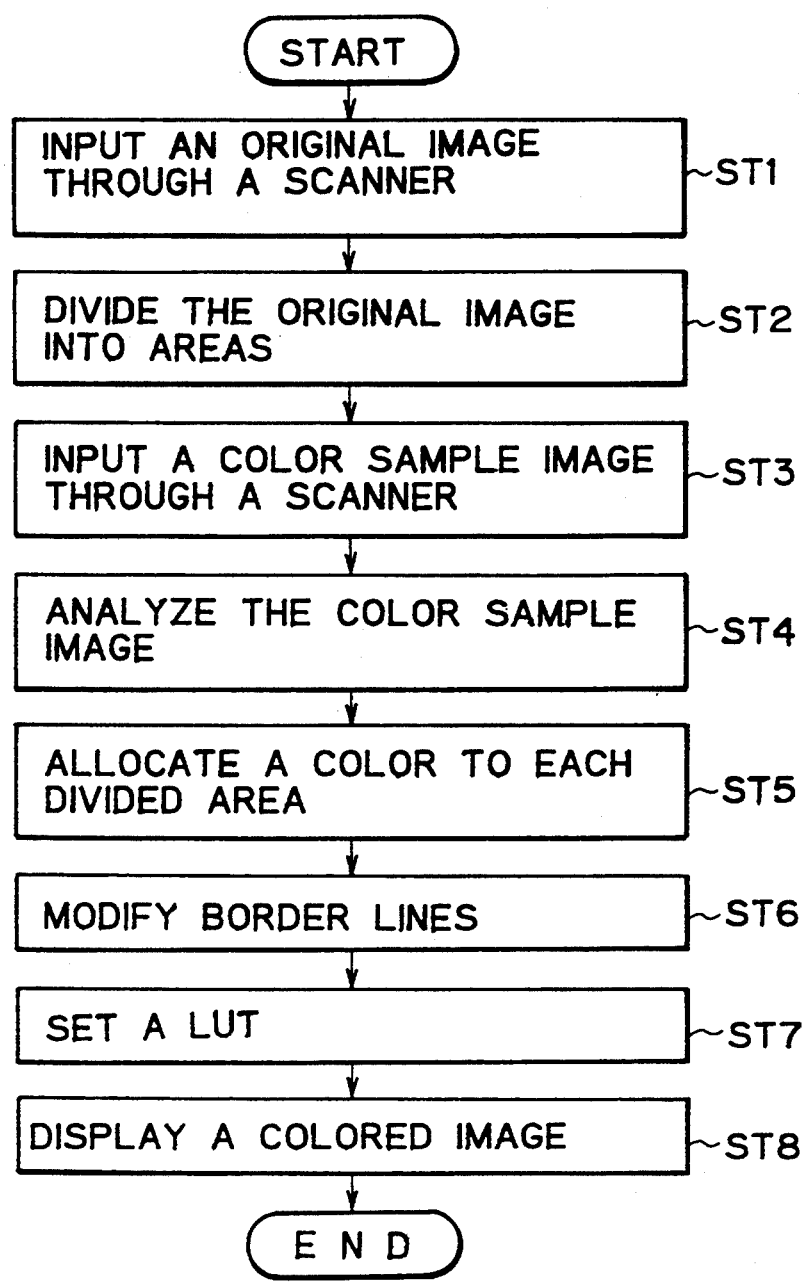
FIG. 15 is a flowchart for explaining an operation of the image processing apparatus shown in FIG. 14.

In turn, the description will be directed to the operation of the image processing apparatus according to this embodiment as referring to FIG. 15, which is a flowchart for explaining the operation.

As shown in FIG. 15, the process at the steps S1 to S5 executed in the image processing apparatus of the first invention corresponds to the process at the steps ST1 to ST5 executed in the image processing apparatus of the second invention.

That is to say, at first, a monochrome original image to be colored is input to the apparatus through the scanner, which is an example of the original image input device 31 (step ST1). The input original image data are stored in the image memory 33 under the control of the microprocessor 32. Then, the microprocessor 32 operates to divide the original image into a plurality of areas as reading the original image data from the image memory 33. Then, the divided areas are labeled by the reference numbers. The data about the divided areas are stored in the area-data memory 39 (step ST2).

The process of dividing the original image at the step ST2 can be executed by the various methods.

Figure 16:
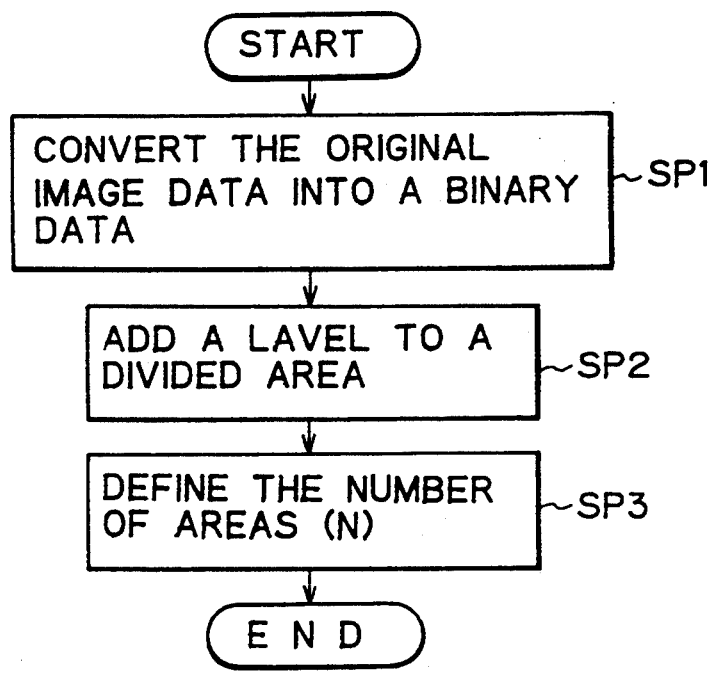
FIG. 16 is a flowchart for explaining an embodiment of an operation of dividing an original image in the image processing apparatus shown in FIG. 14.

FIG. 16 is a flowchart for explaining an embodiment of the dividing process of the original image executed in the image processing apparatus shown in FIG. 14.

As shown in FIG. 16, at first, the input original image is converted into a binary data (step SP1). A label is given to each of areas so that regions to which the same value is labeled are regarded as one region (step SP2). Then, the number of areas N (positive integer) is defined (step SP3).

Next, the color sample image is input to the image processing apparatus through the scanner, which is an example of the image input device 34 (step ST3). The input color sample image data are stored in the image memory 35 under the control of the microprocessor 32.

The microprocessor 32, then, operates to analyze the color sample image data stored in the image memory 35 and select the same number of colors as the number of areas N divided at the step ST2 as the colors to be painted on the divided areas (step ST4).

The method of selecting these colors may employ the following method.

Figure 17:
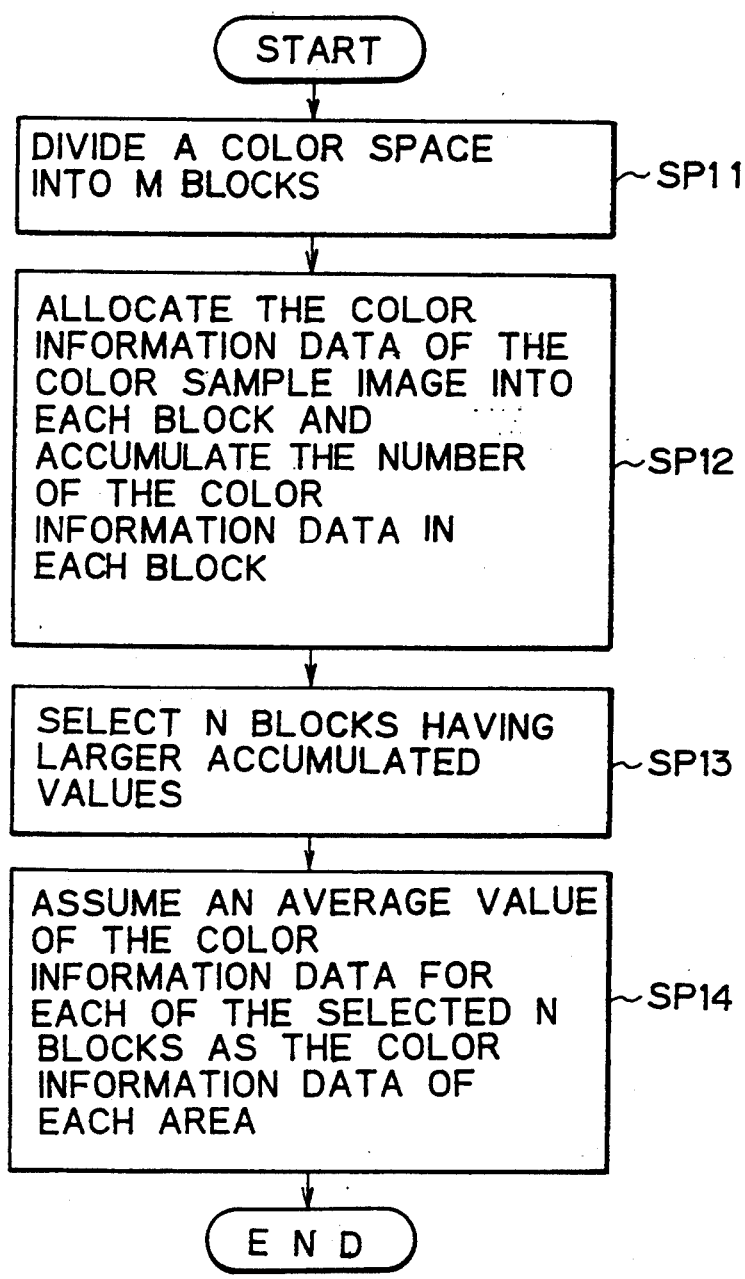
FIG. 17 is a flowchart for explaining an embodiment of a method for selecting a color used for painting each divided area of an original image in the image processing apparatus shown in FIG. 14.

FIG. 17 is a flowchart for explaining an embodiment of the method for selecting colors used for painting each divided area of the original image in the image processing apparatus shown in FIG. 14.

As shown in FIG. 17, in the selecting method, a color space (for example, an RGB space assumed that the color information data is (R, G and B)) is divided into M (M is a positive integer) blocks (step SP11). It is checked how blocks contained in the M blocks of this color space share the color information data about all the points of the color sample image and the number of color information data contained in each block is accumulated (step SP12). Herein, R stands for red, G stands for green and B stands for blue. Further, the total number M of blocks is set to be larger than the number of the divided areas N.

Next, the N blocks having larger accumulated values are selected from the M blocks (step SP13). Then, an average value of the color information data contained in each of the N blocks is derived and each average value is assumed as the color information data of each area (step SP14).

In place of using the RGB space as the color space, another color coordinate may be used for representing the color information data and the color-coordinate space may apply to this method. Alternatively, the dividing arrangement of the color space is not limited to the M blocks.

After selecting the N color information data, the microprocessor 32 operates to allocate the color for each selected data to each divided area of the original image based on the content of the area-data memory 39. The resulting colored image data are stored in the image memory 36 (step ST5 shown in FIG. 15).

The allocation of the color to each divided area is allowed to be executed by a method in which the characteristics of the color image is reflected, that is, a method of using the information data of the color image such as an area largeness.

Figure 18:
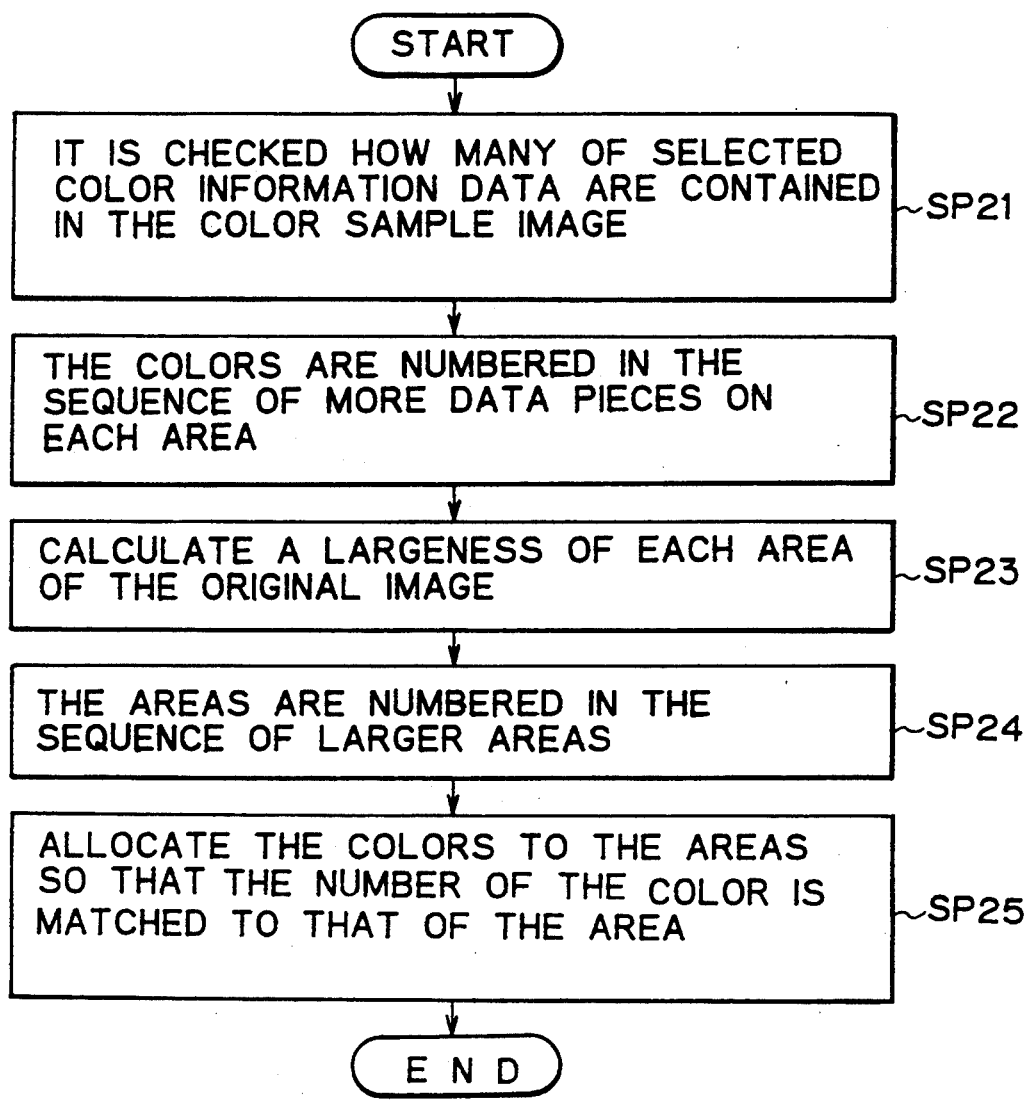
FIG. 18 is a flowchart for explaining an embodiment of a method for allocating a color to each divided area of an original image in the image processing apparatus shown in FIG. 14.

FIG. 18 is a flowchart for explaining an embodiment of the method of allocating a color to each divided area of the original image in the image processing apparatus shown in FIG. 14.

In the case of using the area largeness as the information data, as shown in FIG. 18, at first, it is checked how many color information data selected at the step ST4 (see FIG. 15) are contained in the color sample image (step SP21). The colors are numbered in the sequence of more data, that is, in the larger areas sequence (step SP22). Next, the largeness of each divided area of the monochrome original image is checked (step SP23). Those divided areas are numbered in the sequence of larger areas (step SP24). Next, the color is allocated to each area so that the number of the color may be matched to that of the area (step SP25).

This method results in being able to paint the color occupying a wider area of the color sample image on a larger area of the original image. Hence, the color arrangement of the color sample image is more reflected on the colored original image.

After allocating the color to each divided area of the original image, the microprocessor 32 operates to paint the colors on the original image and store the image data containing hue, saturation and lightness in the image memory 36.

As mentioned above, the allocation of the color to each of the divided areas has been executed at the step ST5 of FIG. 15. The processing of the borders follows the color allocation (step ST6 of FIG. 15).

Figure 19:
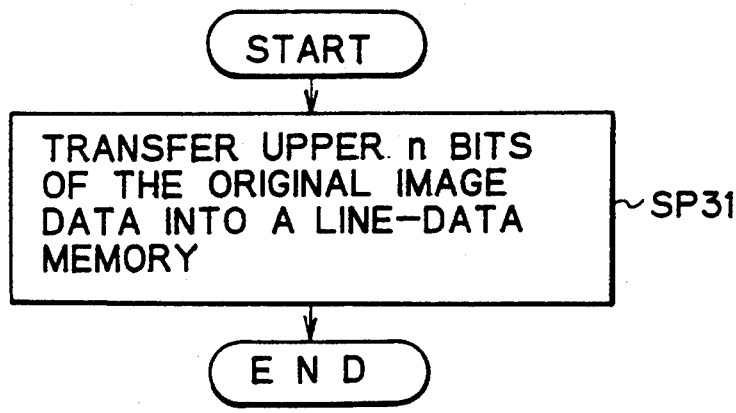
FIG. 19 is a flowchart for explaining an embodiment of a processing operation of borders in the image processing apparatus shown in FIG. 14.

FIG. 19 is a flowchart showing an embodiment of an operation of processing the borders in the image processing apparatus shown in FIG. 14.

As shown in FIG. 19, the microprocessor 32 operates to transfer upper n bits (n is a positive integer) of all the data about the original image from the image memory 33 to the line-data memory 42 (step SP31).

Next, the microprocessor 32 operates to mix the color data corresponding to a line color (normally black) with data of the pixels located on the peripheral portion of the borders of the image data stored in the image memory 36 at a predetermined mixing ratio for arranging the color of the peripheries of the borders. This mixing operation is based on the upper n bits of the original image data stored in the line-data memory 42 and the data about the divided areas of the original image stored in the area-data memory 39. The color-arranged result is stored in the memory included in the LUT unit 40 as the image-display data, which is displayed on the display unit 41 (step ST7 of FIG. 15).

Figure 20:
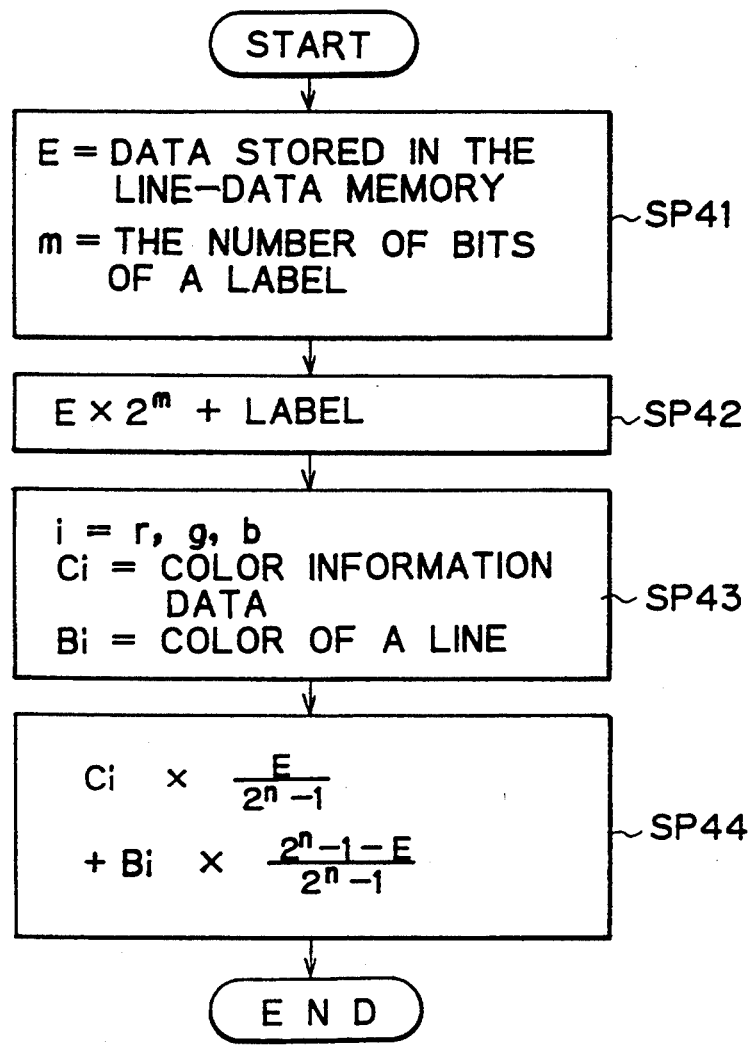
FIG. 20 is a flowchart for explaining a method of setting an LUT for processing borders in the image processing apparatus shown in FIG. 14.

FIG. 20 is a flowchart for explaining a method of setting an LUT (Look-Up Table) for processing the borders in the image processing apparatus shown in FIG. 14.

As shown in FIG. 20, the processing of the borders, that is, the color allocating operation is executed on the assumption that E is the data stored in the line-data memory 42, m is the number of bits of a label, that is, the number of bits corresponding to the reference number given to the divided areas of the original image represented by a binary manner, n is the number of bits stored in the line-data memory. (The value E of the data stored in the line-data memory stays in the range of $0 \leq E < 2^n$. $E = 2^n - 1$ corresponds to a background, $E = 0$ corresponds to a line and $0 < E < 2^n - 1$ corresponds to the borders between the line and the background.) (step SP41). The input of the LUT unit 40 is assumed to be $E \times 2^m + (\text{label})$ (step SP42).

Herein, assuming that i is a subscript corresponding to r (red), g(green) and b(blue), Ci is the color information data read from the image memory 36, Bi is the color information data about a line (step SP43), the color information data Fi about the pixels located on the peripheral portion of the borders can be derived by the following equation (step SP44). The derived color information data Fi is written as the image-display data in the memory included in the LUT unit 40.

$$Fi = Ci \times E/(2^n - 1) + Bi \times (2^n - 1 - E)/(2^n - 1)$$

The display unit 41 serves to display the colored image based on the image-display data read from the memory included in the LUT unit 40 (step ST8 shown in FIG. 15).

As set forth above, the image processing apparatus according to the second invention is capable of inputting a plurality of colors at one time without having to input one color at one time. This results in being able to easily input the color data used for painting the original image for quite a short time.

Further, the color input is carried out by inputting a color sample image without directly inputting the color data. Hence, an operator having insufficient knowledge about the color arrangement can effectively paint colors on the original image. Concretely, in the case that the operator tries to define a color arrangement, at a first stage, it is likelihood that he or she does not directly define concrete colors but picks up an abstract color image representing an atmosphere of autumn or a bright color image, for example. In this case, the known apparatus needs the operator to take the steps of determining the color arrangement for the abstract color image and inputting the colors into the apparatus itself. However, an ordinary person except a person having sufficient knowledge about color arrangement like a designer is difficult to take those steps. On the other hand, the image processing apparatus according to the embodiment of the second invention is capable of automatically determining a color arrangement representing an atmosphere of autumn, for example, simply by inputting a picture or a photograph standing for an autumn landscape as a color sample image.

Figure 21:
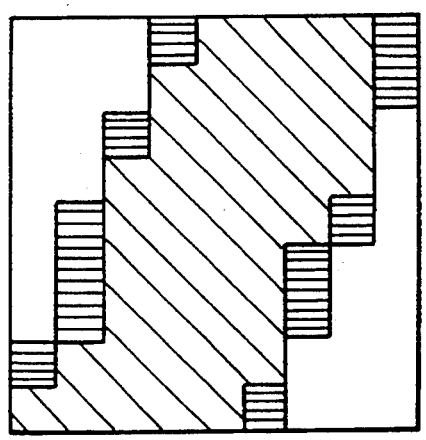
FIG. 21 is an expanded view showing the portion containing the borders of each divided area of the colored image obtained by the image processing apparatus shown in FIG. 14.

FIG. 21 is an expanded view showing the portion containing the borders of each divided area of the colored image obtained by the image processing apparatus shown in FIG. 14. Herein, the oblique lines denote the borders and the horizontal lines denote the portion wherein the color is gradually changed from the color of the borders to the inside color of the area.

As shown in FIG. 21, the image processing apparatus of the second invention is capable of representing the borders as not a jagged but smooth natural curve, because the color is gradually changed from the borders to the inside of the divided area without having to abruptly change the color on the portion of the borders. The resulting borders do not seem to be thinner than the actual borders. The color is also gradually changed from the borders to the inside of each divided area. This results in making it possible to obtain a naturally-colored image.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image processing apparatus for coloring an original image, said apparatus comprising:

inputting means for inputting an original image to be painted and a color image for giving a key information determining a coloring of said original image;

dividing means for dividing said original image input by said inputting means into a plurality of divided areas, and for dividing said color image input by said inputting means into a plurality of divided areas;

calculating means for calculating a first area parameter representative of a geometrical feature of each of said divided areas with respect to said color image, and for calculating a second area parameter representative of a geometrical feature of each of said divided areas with respect to said original image;

ordering means for ordering said first area parameters and for ordering said second area parameters; and coloring means for coloring said original image in such a manner that a divided area of said original image having a second area parameter has a color of a divided area of said color image, which has a first area parameter having the same order as said second area parameter.

2. An image processing apparatus according to claim 1, wherein said inputting means includes means for inputting an original image to be painted and means for inputting a color image, said means for inputting an original image to be painted and said means for inputting a color image includes a scanner and a memory, respectively.

3. An image processing apparatus according to claim 1, wherein said apparatus comprises means for converting colored image data generated by said coloring means into colored image data for display and means for displaying the colored image data for display.

4. An image processing apparatus according to claim 3, said means for displaying the colored image data for display includes a display unit.

5. An image processing apparatus according to claim 1, wherein said dividing means includes a microprocessor and a memory.

6. An image processing apparatus according to claim 1, wherein said calculating means includes a microprocessor.

7. An image processing apparatus according to claim 1, wherein said coloring means includes a microprocessor.

8. An image processing apparatus according to claim 1, wherein each of said first area parameter and said second area parameter comprises an area for each of said divided areas.

9. An image processing apparatus according to claim 1, wherein each of said first area parameter and said second area parameter comprises a coordinate of a center of gravity for each of said divided areas.

10. An image processing apparatus according to claim 1, wherein each of said first area parameter and said second area parameter comprises a peripheral length for each of said divided areas.

11. An image processing apparatus for coloring an original image, said apparatus comprising:

inputting means for inputting an original image to be painted and a color image for giving a key information determining a coloring of said original image;

dividing means for dividing said original image input by said inputting means into a plurality of divided areas, and for dividing said color image input by said inputting means into a plurality of divided areas;

calculating means for calculating a first area parameter representative of a geometrical feature of each of said divided areas of said color image, and for calculating a second area parameter representative of a geometrical feature of each of said divided areas of said original image;

ordering means for ordering said first area parameters and for ordering said second area parameters; and coloring means for coloring said original image in such a manner that a divided area of said original image having a second area parameter has a color of a divided area of said color image, which has a first area parameter having the same order as said second area parameter; and means for processing a border line among a plurality of said divided areas, and for changing a color of a portion of said divided areas adjacent to said border line based on a predetermined data of the original image input by said inputting means.

12. An image processing apparatus according to claim 11, wherein said inputting means includes means for inputting an original image to be painted and means for inputting a color image, said means for inputting an original image to be painted and said means for inputting a color image includes a scanner and a memory, respectively.

13. An image processing apparatus according to claim 11, wherein said apparatus comprises means for converting colored image data generated by said coloring means into colored image data for display and means for displaying the colored image data for display.

14. An image processing apparatus according to claim 13, said means for displaying the colored image data for display includes a display unit.

15. An image processing apparatus according to claim 11, wherein said dividing means includes a microprocessor and a memory.

16. An image processing apparatus according to claim 11 wherein said calculating means includes a microprocessor.

17. An image processing apparatus according to claim 11 wherein said coloring includes a microprocessor.

18. An image processing apparatus according to claim 11, wherein said means for processing a border line includes a microprocessor and a memory.

19. An image processing apparatus according to claim 11, wherein each of said first area parameter and said second area parameter comprises an area for each of said divided areas.

20. An image processing apparatus according to claim 11, wherein each of said first area parameter and said second area parameter comprises a coordinate of a center of gravity for each of said divided areas.

21. An image processing apparatus according to claim 11, wherein each of said first area parameter and said second area parameter comprises a peripheral length for each of said divided areas.

* * * * *